United States Patent [19]
Sutherland et al.

[11] Patent Number: 5,981,020
[45] Date of Patent: Nov. 9, 1999

[54] WIND-RESISTANT LAMINATED FABRIC

[75] Inventors: Derek A. Sutherland, Broadalbin, N.Y.;
William F. Willard, Portland, Oreg.

[73] Assignee: Harrison Technologies Inc.,
Gloversville, N.Y.

[21] Appl. No.: 08/976,445

[22] Filed: Nov. 25, 1997

[51] Int. Cl.[6] ............................................. B32B 3/02
[52] U.S. Cl. ................... 428/85; 156/82; 428/317.1;
428/317.5; 442/30; 442/56; 442/221; 442/223;
442/315; 442/370
[58] Field of Search ............................... 442/30, 56, 221,
442/223, 315, 370; 428/85, 317.1, 317.5;
156/82

[56] References Cited

U.S. PATENT DOCUMENTS

| | | |
|---|---|---|
| 1,825,827 | 10/1931 | Smith . |
| 3,410,748 | 11/1968 | Blue .......................................... 156/78 |
| 3,698,973 | 10/1972 | Wisotzky et al. ......................... 156/78 |
| 3,855,048 | 12/1974 | Bagnall . |
| 4,147,829 | 4/1979 | Holland .................................... 428/311 |
| 4,311,745 | 1/1982 | Civardi ..................................... 428/91 |
| 5,439,733 | 8/1995 | Paire ........................................ 428/219 |
| 5,593,754 | 1/1997 | Blauer et al. ............................ 428/131 |

FOREIGN PATENT DOCUMENTS

| | | |
|---|---|---|
| 2051601 | 7/1973 | Germany . |
| 926647 | 5/1963 | United Kingdom . |
| 1110472 | 4/1968 | United Kingdom . |
| 2024099 | 1/1980 | United Kingdom . |

*Primary Examiner*—James J. Bell
*Attorney, Agent, or Firm*—Schmeiser, Olsen & Watts

[57] ABSTRACT

The present invention includes a foam flame bonded fabric laminate that is wind-resistant, breathable, and supple along with a low cost process for producing it. The apparatus of the present invention comprises a foam bonding agent layered between fabrics or other materials where the foam possesses wind-resistant and breathable characteristics independent of the other layers. The process of the present invention involves two-step foam flame bonding with each step accomplished in a separate pass through a laminating device. In one embodiment, the first step includes lightly exposing a thin polymer foam (such as polyester polyurethane or polyether polyurethane) to a flame without preheating, then pressing it against the inner face of mesh or tricot. The second step includes more vigorously exposing the foam face of the foam-mesh or foam-tricot laminate to a flame, then pressing it against the inner face of a berber, pile, or fleece fabric. The foam cells exposed to the flame collapse to a tiny-pored membrane state rendering the foam laminate 80–90% wind-resistant yet more breathable than conventional three-ply film laminates.

30 Claims, 3 Drawing Sheets

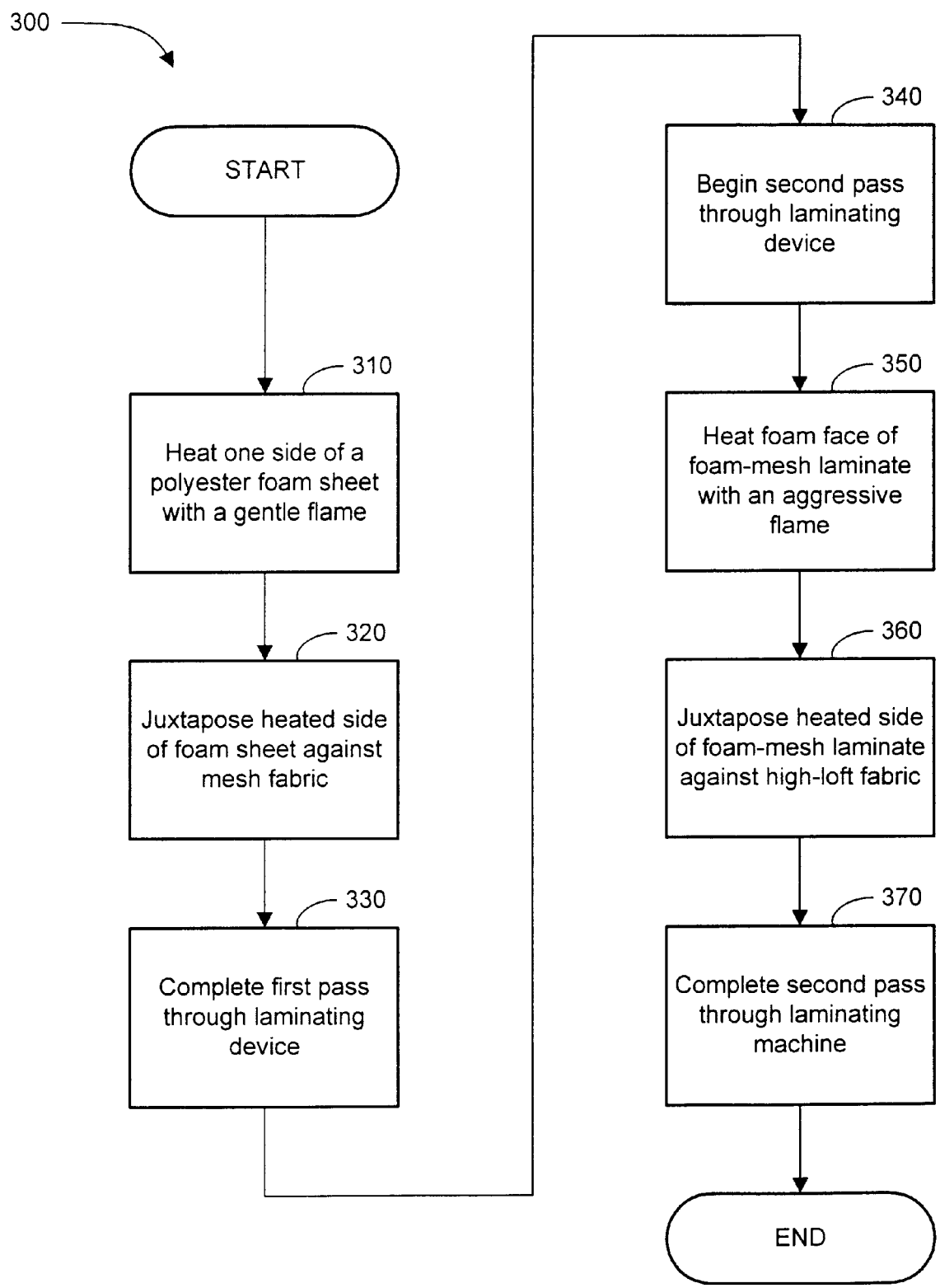

FIRST PASS

SECOND PASS

WIND-RESISTANT LAMINATED FABRIC

BACKGROUND OF THE INVENTION

1. Field of the Invention

The invention relates to the field of laminated fabric and processes for producing it. More particularly, the invention is a wind-resistant, breathable laminated fabric and the process for producing it.

2. Description of Related Art

There are a number of different weatherproof, breathable fabrics, some of which are fabric laminates, wherein a weatherproof material can be one that is only windproof, only waterproof, or both windproof and waterproof. The existence of a multitude of weatherproof, breathable fabrics is evidence of the consumer demand for and high utility of such products. Many people who spend a substantial amount of time outside have experienced the discomfort of wearing typical weatherproof, non-breathable clothing. The fabric from which typical weatherproof, non-breathable clothing is manufactured keeps out water and wind, but also keeps in moisture. People naturally perspire and people exerting themselves perspire even more. Accordingly, people exerting themselves while wearing non-breathable clothing will quickly begin to feel the dampness of moisture in their clothing from accumulated perspiration. The dampness increases as the perspiration continues to accumulate causing further discomfort. When people wear weatherproof clothing to keep out water and wind, they often wear clothing to insulate their bodies from the cold in conjunction with the weatherproof clothing. Unfortunately, the effectiveness of most types of insulating materials used in clothing is diminished when moisture accumulates in the clothing. Accordingly, people wearing non-breathable clothing often experience the discomfort of dampness as well as the discomfort of becoming cold. Some of the references disclosing conventional fabrics to overcome such problems include U.S. Pat. No. 5,439,733 issued to Paire, U.S. Pat. No. 4,311,745 issued to Civardi, U.S. Pat. No. 4,147,829 issued to Holland, U.S. Pat. No. 3,855,048 issued to Bagnall, and U.S. Pat. No. 3,410,748 issued to Blue. The indicated references while at least partially successful in providing weatherproof, breathable fabric do not overcome the problems associated with spending time outside.

One of the problems associated with conventional weatherproof, breathable fabric is that its performance is generally inadequate. Performance of a fabric involves several criteria, including how well it inhibits wind and liquid water seepage, how well it permeates water vapor, and how comfortable it is to wear when used in clothing. Conventional weatherproof fabrics claiming to be breathable usually perform quite well at inhibiting wind and liquid water from seeping though the material, but perform rather poorly at permeating water vapor away from the wearer. It is well known that a person who wears the most popular types of weatherproof, breathable fabrics while exerting themselves will quickly accumulate perspiration moisture in their clothing. The most popular of fabrics appear to perform well in breathability only when perspiration rates are low. Also, conventional fabrics are known for being uncomfortable to wear in that they are "boardy" or stiff to the touch. Interestingly, when weatherproof, breathable fabrics first became available, their popularity soared, but that popularity has backlashed to some extent. Many consumers have become so dissatisfied with the lack of performance in the areas of breathability and comfort that they prefer to wear breathable, comfortable fabric and take other measures to protect themselves from wind and water.

The counter trend in consumer demand is also well recognized and attempts have been made to improve the breathability and comfort of fabrics. Solutions have centered upon attempting to change the materials and/or processes used to manufacture weatherproof, breathable fabrics in a manner that yields a more desirable product. Former processes involved laminating a breathable film between an inner and an outer fabric. Such lamination was accomplished by placing adhesive layers in between the three-ply combination, yielding a five-layer fabric laminate comprising an outer fabric, adhesive line, film, adhesive line, and inner fabric. Depending on the specific film and inner and outer fabrics chosen, the final fabric possessed some degree of a weatherproof characteristic and some degree of a breathable characteristic. A central problem of all such fabrics manufactured using this process was that breathability was unsatisfactory and the combination of the film and two fabrics held together with adhesive left the fabric too "boardy" and stiff. The process was additionally undesirable because of its cost. The film was an expensive material to include and there was more risk of processing failure because of multiple processing steps, any one of which could fail and yield a defective product.

Current technology teaches use of polymer foam as a bonding agent between fabrics that allows the bonded fabrics to maintain more of their original flexibility after bonding than the same fabrics bonded with adhesive. A laminate of two supple fabrics bonded together with adhesive will generally be less supple than the two original fabrics, but if polymer foam is used not as much suppleness is lost. Current technology also teaches various methods for effectuating a bond between a polymer foam and fabric so that the foam can act as a bonding agent between two fabric layers. Some methods use a third material, such as adhesive or a thermosetting polymer placed between the foam and fabric to bond them together, but in such cases the polymer foam is really a filler between fabrics rather than a true bonding agent. Methods wherein the foam is a true bonding agent involve applying both heat and pressure to encourage the foam to become embedded in the fibers of the fabric, forming the necessary bond. It is well-known that heating polymer foam by exposing it to a flame and compressing it with heated rollers onto fabric will melt the foam and embed it into the fabric, forming a high-strength bond. This method is typically called foam flame bonding.

Within the foam flame bonding technology, it is also known that if the temperature of the foam is high and the compressive pressure of the foam onto the fabric is high that any suppleness of the original fabric will be reduced. Generally, current technology teaches that a trade-off exists between bond strength and suppleness. The temperatures and pressures applied in foam flame bonding may be reduced to correspondingly reduce the loss of suppleness, but the bond strength will be reduced as a result. Bagnall discloses one method of forming a bond between foam and fabric that attempts to overcome the trade-off by yielding a strong bond without sacrificing fabric suppleness. The Bagnall method involves using a single-pass laminating machine to heat one side of a polyester urethane foam sheet to less than 360° C. with a very weak flame before pressing it against a fabric layer, and then to heat the foam face of the foam-fabric laminate to greater than 400° C. with a fierce flame before pressing it against a second fabric layer. This method apparently yields a fabric with equivalent drape properties to conventional foam laminates, but with greater bond strength. However, the fabric nonetheless lacks a weatherproof and breathable characteristic.

The advancement of the foam flame bonding technology provided a way to bond breathable films to fabrics without sacrificing as much of the suppleness formerly lost by bonding films to fabrics with adhesive. Although such advancements eliminated a portion of the stiffness, some of it remained and the problem of breathability remained as well. Accordingly, current technology does not teach a method for forming a foam flame bonded fabric laminate that is weatherproof, breathable, and supple.

Thus, it can be seen from the above discussion that it would be an improvement in the art to provide a strongly bonded fabric laminate that is weatherproof, breathable, and supple. Specifically, this means providing a foam flame process for manufacturing such fabric that overcomes the disadvantages of the current technology.

SUMMARY OF THE INVENTION

According to the present invention, a foam flame bonded fabric laminate that is wind-resistant, breathable, and supple is provided along with a low cost and low risk process for producing it. The apparatus of the present invention comprises a foam bonding agent between two fabrics where the foam possesses wind-resistant and breathable characteristics independent of the two fabrics. Also, the foam is strongly bonded to the fabrics as a result of bonding by a foam flame method. Further, one or both of the fabrics may be a high-loft fabric such as berber, pile, or fleece that is both soft and insulating.

The process according to the present invention involves two-step foam flame bonding with each step accomplished in a separate pass through a laminating device. First, without preheating a mesh or tricot fabric or a thin polymer foam (such as polyester polyurethane or polyether polyurethane), the foam is lightly exposed to a flame, then pressed against the inner face of the mesh or tricot. The foam surface exposed to the flame melts sufficiently to become tacky and bond with the mesh or tricot, but the foam cells otherwise remain intact. Second, the foam face of the foam-mesh or foam-tricot laminate is more vigorously exposed to a flame, then pressed against the inner face of a berber, pile, or fleece fabric. The foam cells exposed to the flame collapse to a tiny-pored membrane state rendering the foam laminate 80–90% wind-resistant yet more breathable than conventional three-ply film laminates. Additionally, because the fabric laminate is not subjected to significant compression with heated rollers and is flamed lightly at first, the laminate remains very supple by comparison to conventional laminates. Also, the berber, pile, or fleece fabric is not exposed to the flame, nor is it subjected to significant compression, thus maintaining the loft, softness, and insulating capabilities. In another embodiment, the mesh or tricot fabric is replaced by either berber, pile, or fleece to yield a fabric laminate that is soft and lofty on both sides. In yet another embodiment, three or more layers are laminated together by the foam flame bonding process described herein.

It is an advantage of the present invention that the fabric laminate is wind-resistant, breathable, and supple.

It is a further advantage that a strong bond is formed between the foam bonding agent and the fabric layers.

It is a still further advantage that one or more of the fabrics can be a berber, pile, or fleece that is not crushed nor compacted during processing.

It is also an advantage that the foam bonding agent comprises the wind-resistant, breathable material rather than a separate film between the fabric layers or the fabric layers themselves.

It is yet another advantage that the process is accomplished in only two steps that can be controlled within very small tolerances, thus reducing the cost and risk associated with manufacturing the fabric.

The foregoing and other features and advantages of the present invention will be apparent from the following more particular description of preferred embodiments of the invention, as illustrated in the accompanying drawings.

BRIEF DESCRIPTION OF THE DRAWINGS

The preferred embodiments of the present invention will hereinafter be described in conjunction with the appended drawings, wherein like designations denote like elements, and:

FIG. 3 is a flow chart of the method for forming a two-ply foam flame fabric laminate;

DESCRIPTION OF THE PREFERRED EMBODIMENTS

According to the present invention, a wind-resistant, breathable, and supple fabric laminate and method for producing it are disclosed. The fabric laminate is particularly conducive for use in manufacturing clothing worn by people who spend a substantial amount of time outside. The three key characteristics, wind-resistance, breathability, and suppleness, exist as a result of the foam flame bonding process steps and conditions used to produce the fabric. Essentially, the process and apparatus for executing the process may be termed collapsed cell membrane technology (CCMT), since the process causes polyester polyurethane, polyether polyurethane, or other foam to collapse to a tiny-pored membrane state possessing the key characteristics. The preferred embodiment of the fabric laminate and method for producing it are described in FIGS. 1–5 and the explanation below. CCMT is particularly applicable to fabric laminates, however, it may be used to laminate any materials that may be laminated by current foam flame bonding processes.

Figure 1A:
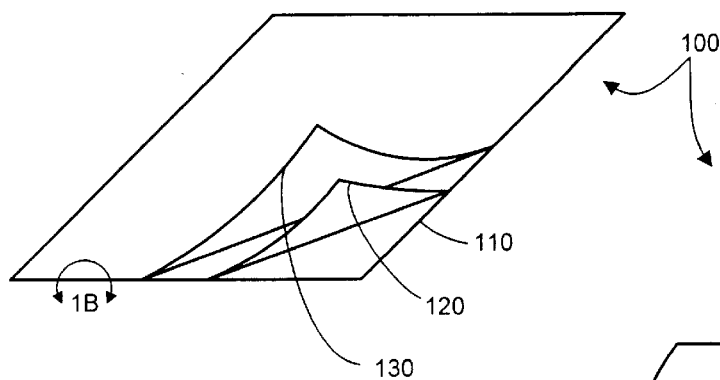
FIGS. 1A and 2A are perspective views of a two-ply and three-ply foam flame fabric laminate, respectively.
Figure 1B:
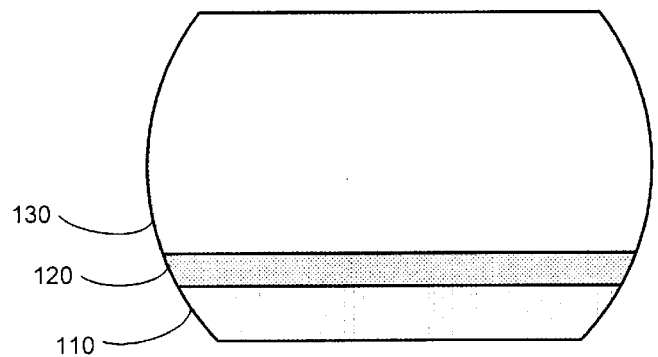
FIGS. 1B and 2B are enlarged views of the edge of a two-ply and three-ply foam flame fabric laminate, respectively.
Figure 2A:
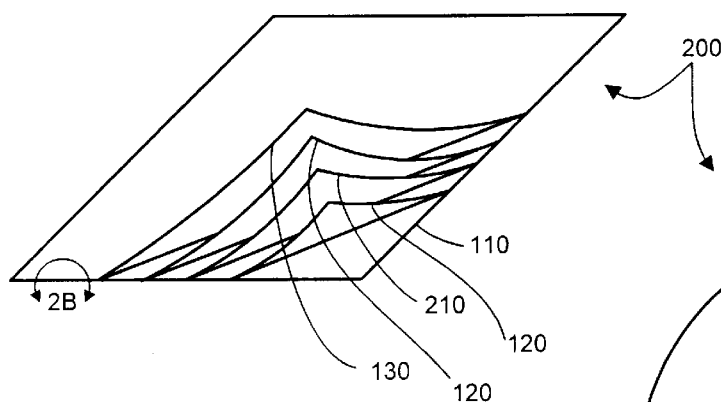
Figure 2B:
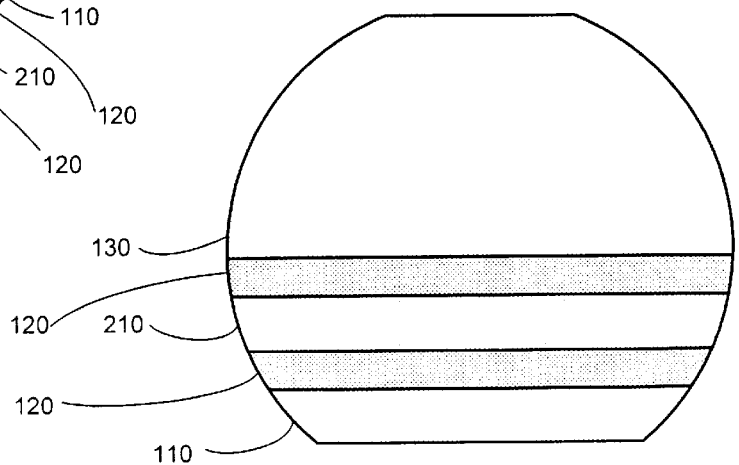

FIGS. 1A and 1B show one embodiment of a two-ply laminate having three layers, while FIGS. 2A and 2B show one embodiment of a three-ply laminate having five layers. The preferred embodiments will depend on the specific use for which the laminate is intended. Laminates of fabric are often used in the manufacture of clothing, accordingly, the preferred embodiment of a fabric laminate will possess layers of material that yield the characteristics desired in the clothing. As indicated, the key characteristics that the present invention provides are wind-resistance, breathability, and suppleness, all of which are desirable in clothing. In addition to a fabric laminate being supple, that is, pliant or yielding, it may be desirable for the clothing to be soft to the touch or possess an insulating quality. Generally, clothing that is soft to the touch will also be quiet, that is, it will not make perceptible noise when rubbed together or against other objects. A quiet fabric laminate is particularly desirable in clothing used in hunting or golf.

All of the characteristics described may be incorporated into a fabric laminate using CCMT by selecting nylon or polyester mesh or tricot as one layer and selecting berber, pile, fleece, or other soft, high-loft fabric with some insulating quality as another layer. FIGS. 1A and 1B indicate how such a two-ply fabric laminate 100 might appear. The mesh layer 110 provides support and protection for the foam layer 120 adhered to the mesh layer and will generally be the inside fabric in clothing manufactured with the fabric laminate 100. The high-loft layer 130 is in turn adhered to the foam layer 120 to provide softness and an insulating quality to the fabric laminate 100 and will generally be the outside or face fabric. Because the laminate is fabricated using CCMT, it will additionally be wind-resistant, breathable, and supple.

FIGS. 2A and 2B indicate how a similar three-ply fabric laminate 200 might appear. The mesh layer 110 provides support and protection for the foam layer 120 adhered to the mesh layer and will generally be the inside fabric in clothing manufactured with the fabric laminate 100. However, unlike the fabric laminate 100 described above, an intermediate layer 210 is in turn adhered to the foam layer 120 also adhered to the mesh layer 110. Another foam layer 120 is used to adhere the intermediate layer 210 to the high-loft layer 130. As above, the high-loft layer 130 provides softness and an insulating quality to the fabric laminate 100 and will generally be the outside or face fabric. Because the three-ply laminate is also fabricated using CCMT, it will additionally be wind-resistant, breathable, and supple.

Notably, many different materials may be selected for the intermediate layer depending on the properties desired for the final laminate. Current technology teaches a three-ply fabric laminate where the intermediate layer is a weatherproof film. Because adhesive was used to bond the layers together, the conventional three-ply laminates were typically stiff, uncomfortable, and only slightly breathable. According to the present invention, CCMT may be used to produce a three-ply fabric laminate having a weatherproof film. Using a typical film would render the fabric laminate only slightly breathable, but it would be less stiff and uncomfortable than the conventional laminates. It is desirable to use film that is actually less weatherproof and more breathable than a typical film. Previously, such films were considered inadequate because they lacked sufficient weatherproofness, but, in combination with the two wind-resistant, breathable foam layers, the laminate may be highly desirable. Knowing the individual degree of wind-resistance and breathability of the foam layers and film, a manufacturer can balance the properties of selected materials and CCMT to yield three-ply laminates with varying degrees of wind-resistance, water-resistance, and breathability. Although it may not be preferred, a three-ply laminate could be produced that is 100% wind-resistant (i.e., windproof), 100% water-resistant (i.e., waterproof), and at least somewhat breathable. Also, the present invention includes the production of a four-ply laminate or one with even more layers, however, such laminates are generally somewhat costly to produce.

Despite the possibility of varying degrees of wind-resistance, water-resistance, and breathability in three-ply laminates, the main advantages of the present invention are best realized in a two-ply laminate. A two-ply laminate can be assembled in less time than a three-ply laminate because a two-ply only requires two main process steps, as describe below, while a three-ply requires four main process steps. Because of the extra steps and materials required, the three-ply will be more costly. The higher cost results from the additional expense of operating equipment and providing material for an intermediate layer and additional foam layer, as well as from the increased risk of producing a defective laminate. Generally, as the number of handling steps and process steps increase, the risk of damaging the final laminate or performing a process step incorrectly also increases, thus yielding a defective product. Accordingly, it is desirable to produce a wind-resistant, breathable fabric laminate in two main steps rather than four.

The basic process 300 for implementing CCMT is described in FIG. 3. Specifically, the process shown is for a two-ply fabric laminate of mesh and a high-loft fabric. If a three-ply fabric is desired, then the two steps of the two-ply process are repeated in a similar fashion and comprise a third and fourth step of adding a second foam layer and another material layer, respectively. Also, the present invention includes executing the process with other materials in place of the mesh, tricot, and/or high-loft fabric such as those discussed above. Steps 310 to 330 constitute the first pass through a laminating device or the first main process step. Steps 340 to 370 constitute the second pass through a laminating device or the second main process step.

The first pass comprises step 310 of heating only one side of the foam layer with a gentle flame and step 320 of juxtaposing the heated side against the mesh layer. The heating step 310 must subject the foam to conditions that will melt just enough of the foam surface to allow the foam to adhere to the mesh, but not so much that the foam is unnecessarily degraded prior to the second pass. In step 320, juxtaposing the two layers occurs with rollers as in any fabric laminating device where layers are pressed together. Step 330 of completing the first pass includes any additional processing or handling of the foam-mesh laminate needed to prepare it for the second pass.

The second pass comprises heating only the foam face of the foam-mesh laminate with an aggressive flame and juxtaposing the heated side against a high-loft fabric. The heating step 350 must subject the foam to conditions that will simultaneously allow the foam to adhere more securely to the mesh, adhere the foam securely to the high-loft fabric, and cause the foam cells to collapse into a tiny-pored membrane that will cure to be wind-resistant and breathable. Specifically, the foam laminate is 80–90% wind-resistant yet more breathable than conventional three-ply film laminates. That is, the foam laminate prevents the penetration of 80–90% of a given flow of air directed through the laminate. Also, it is important that the high-loft fabric not be subjected to any significant heat. Typically, such fabrics are synthetic, just as the foam, and too much heat may cause the loft to compact or recede and lose some of its insulating capabilities and softness. In step 360, juxtaposing the two layers occurs with rollers as in any fabric laminating device where layers are pressed together, however, care must also be taken not to overly compress the high-loft fabric. Too much compression may crush the loft of the fabric, degrading its insulation capabilities and softness. Step 370 of completing the second pass includes any additional processing or handling of the completed laminate needed to prepare it for manufacture of clothing.

It is strongly preferred that the foam laminate not be 100% wind-resistant (i.e. windproof), since the penetration of a small amount of wind facilitates the removal of moisture from the laminate without decreasing insulation effectiveness. Rather, the removal of moisture by slight wind penetration actually helps maintain the insulation effectiveness of the laminate. Typically, perspiration collects in clothing unless it can readily dissipate and, when moisture collects in most types of insulating materials, their effectiveness will diminish. A 70–99% wind-resistant laminate allows slight wind penetration and yields a drying effect on any moisture accumulated in the laminate without a substantial decrease in insulation effectiveness. However, an 80–90% wind-resistant laminate is preferred to optimize the amount of drying while sufficiently limiting wind penetration. It is well known that a wind chill effect occurs with exposure to wind speeds above 6.5 km/h. That is, the rate of heat loss from exposed human skin increases as wind speed increases. For example, at a wind speed of 40 km/h and an air temperature of 0° C., human heat loss will occur at a rate equivalent to the heat loss at −15.8° C. with no wind. However, at wind speeds below 6.5 km/h, no wind chill effect occurs. Accordingly, a person wearing a 90% wind-resistant laminate will not experience any wind chill effect on their skin through the laminate unless wind speeds exceed 65 km/h. Any wind penetration that does occur will help the laminate stay dry and retain its full insulation effectiveness.

In addition to preventing a decrease in insulation effectiveness of the laminate, slight wind penetration is indicative of a more breathable fabric that also improves the comfort of the wearer. TABLE 1 demonstrates this benefit by showing test results from a comparison between a fabric laminate produced according to a preferred embodiment of the present invention and a conventional film laminate. Typically, breathability of a fabric is measured in grams per square meter per 24 hours using the industry standard Moisture Vapor Transmission Rate (MVTR) test (Test Method, ASTM-E-96, Method B Upright Cup). The MVTR test simply involves measuring the evaporation rate of water at room temperature from a cup covered with the sample being tested. Under the MVTR test, a fabric laminate according to a preferred embodiment of the present invention is 3–4 times more breathable than conventional three-ply film laminates. However, a more meaningful measurement of breathability, as far as the comfort of the wearer, involves ascertaining moisture-heat permeability, also called heated-vapor loss, to yield the Permeability Index ($i_m$) (as determined by The Textile Protection and Comfort Center (T-PACC) at the College of Textiles, North Carolina State University in Raleigh, N.C.). Instead of simply measuring the rate of evaporation through the fabric, the fabric is placed on a sweating guarded-hotplate also called a skin model. Since the sample is very close to the hotplate and the hotplate "sweats," the $i_m$ is a better indication of how the fabric will perform as to breathability when worn by a person.

TABLE 1

| Property | Film Laminate | CCMT Laminate |
| --- | --- | --- |
| Thickness (mm) | 6.44 | 6.08 |
| Weight (g/m$^2$) [oz/yd$^2$] | 417.4[12.31] | 419.8[12.38] |
| Clo | 1.284 | 1.210 |
| Permeability Index ($I_m$) | 0.382 | 0.707 |
| Comfort Limit (W/m$^2$) | 96 | 125 |

Referring to TABLE 1, noticeably, both laminates possessed similar thickness, weight, and Clo, a unit of thermal resistance, wherein a higher value indicates greater insulating ability. A Clo value of 1.0 represents a typical man's business suit that is expected to maintain thermal comfort in a normal indoor environment. The CCMT laminate possessed an $I_m$ almost double that of the film laminate, meaning that the CCMT laminate is more breathable under conditions simulating moderate activity. An index value of 0.0 indicates complete impermeability while a value of 1.0 indicates complete permeability. The comfort limit is calculated using the other values in the table to predict the metabolic activity level that a wearer may endure and still maintain body thermal comfort. The limit assumes that a wearer will remain in a comfortable condition when 20% or less of the skin surface is wet with sweat. Thermal comfort is no longer present when greater than 20% of the skin surface is wet with sweat. TABLE 1 clearly demonstrates that a wearer of CCMT laminate can expend 30% more energy than the wearer of film laminate and still remain within the comfort limit. Walking on the level at a rate of 3.2 km/hr (2.0 mph) produces a metabolic rate of 115 W/m$^2$. Accordingly, it is readily apparent that a CCMT laminate wearer would be comfortable on such a walk while a film laminate wearer would not.

The increased comfort results from an improved evaporative cooling effect that is only possible because of the improved breathability of a wind-resistant laminate according to a preferred embodiment of the present invention. If moisture from sweat does not transmit through a fabric, then it will accumulate on the wearer's skin and in the fabric. As indicated above, an accumulation on greater than 20% of the skin area is not considered comfortable. Also, accumulation in the fabric reduces insulation effectiveness as water replaces air trapped within the fabric. Since water is much more heat conductive than air, heat loss from the body will then increase to a much higher rate. Accordingly, the wearer is uncomfortable from sweat accumulated on skin and, once the activity and sweating stop, water on the skin and in the fabric continues to evaporate. Such evaporative cooling further removes needed body heat from the then inactive wearer and continued heat loss could induce hypothermia in severe cases.

While the evaporative cooling described above is clearly detrimental, it can be avoided and beneficial evaporative cooling can occur if a fabric is sufficiently breathable. For a laminate according to a preferred embodiment, the improved breathability allows sweat to readily evaporate from the wearer's skin and escape through the laminate. The evaporative cooling during a period of activity thus keeps a wearer comfortable because sweat is not accumulating on the skin. Further, after the activity and sweating stop, little water will have accumulated on the skin or in the fabric and the wearer will not suffer from excessive heat loss while inactive. Slight wind penetration will also assist the beneficial evaporative cooling during a period of activity and yet, after the activity ends, will not allow a wind chill effect to occur from too much penetration. In summary, a preferred laminate prevents the undesired effects of a less breathable or less wind-resistant laminate that might cause discomfort, while still allowing enough moisture transmission that a wearer remains comfortable both during and after moderate physical activity.

Figure 4:
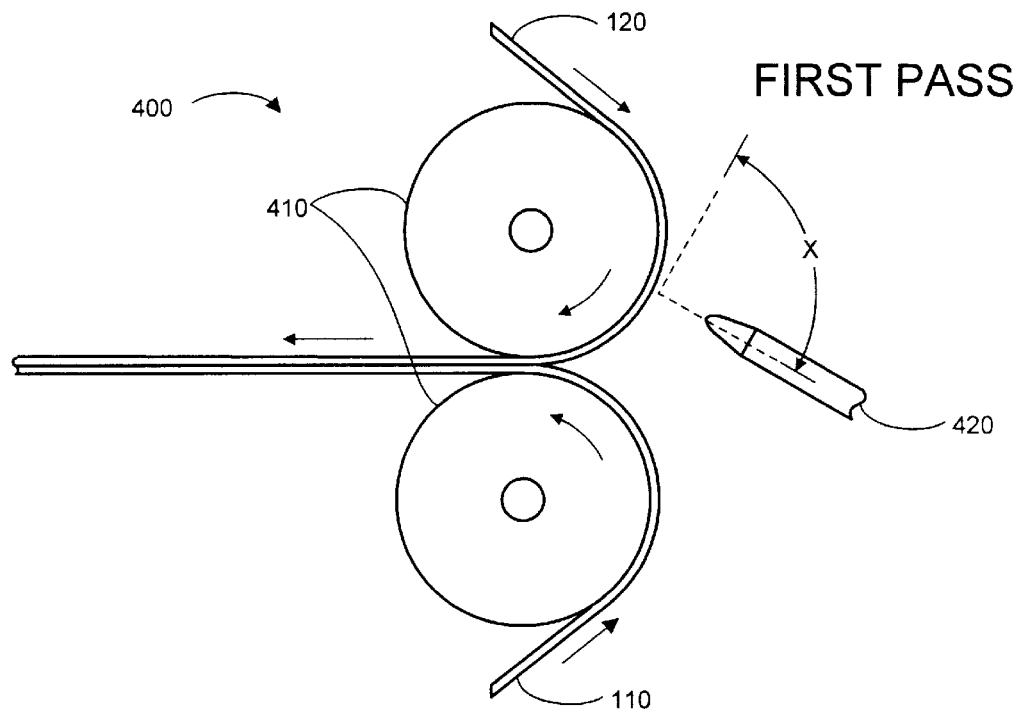
FIG. 4 is a side view of the laminating apparatus during the first pass with foam and mesh.
Figure 5:
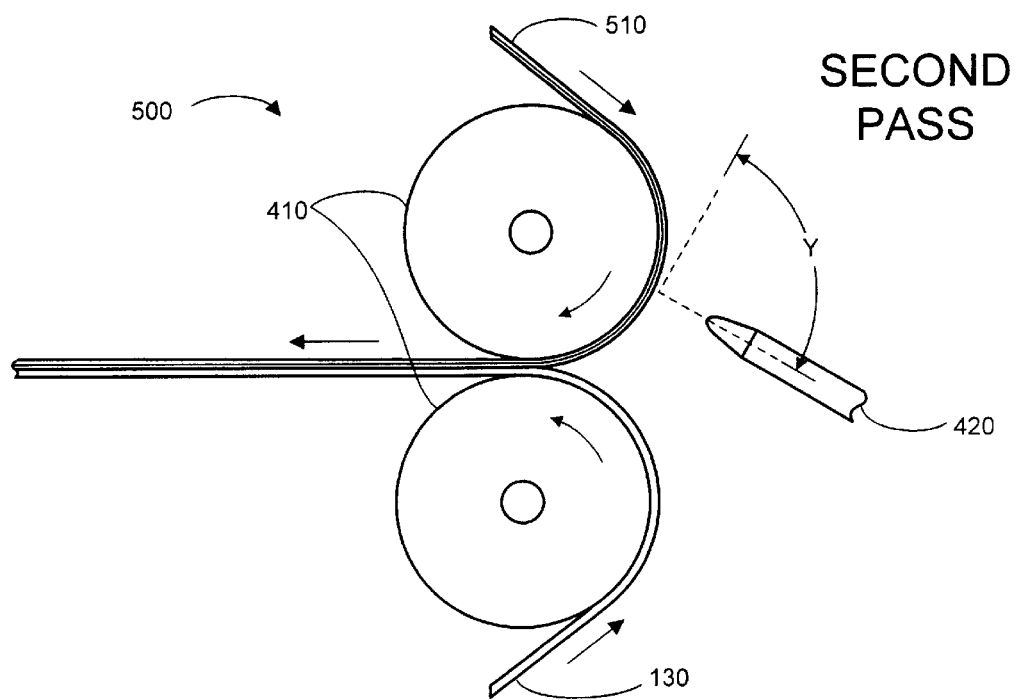
FIG. 5 is a side view of the laminating apparatus during the second pass with a foam-mesh laminate and high-loft material.

Such significant properties of a fabric laminate may be obtained using a novel method of production according to a preferred embodiment. FIGS. 4 and 5 show a portion of a laminating device in a first pass configuration 400 and second pass configuration 500 executing such a method. In FIG. 4, the foam layer 120 is delivered to one of two rollers 410 where a burner apparatus 420 on only one side of the foam heats it with a gentle flame in the first pass. The burner apparatus 420 is selectively positioned at angle X, the angle between the central axis of the flame and a line tangent to the surface of the foam at the point where the central axis line intersects the surface of the foam. Depending on the process conditions, a predetermined temperature will exist at the foam surface and the foam will pass by the flame at a predetermined speed. The angle X and type of flame selected will largely dictate the temperature to which the foam is subjected and the speed will determine the effect that the temperature has on the foam. The slower the speed, the longer a given area of foam will be subjected to the selected temperature and the more effect that temperature will have on the foam. The length of time that a given area of foam is subjected to the selected temperature may be referred to as the flame dwell time. The mesh layer 110 is delivered to the other of the two rollers 410 and juxtaposed with the foam 120 at the same speed with which the foam passes by the flame. Properly adhering the foam to the mesh requires that the foam experiences a sufficiently high temperature to prepare it for adherence to the mesh, but that it passes by the flame rather swiftly, affecting only the surface of the foam layer. In this manner, most of the foam is unaffected in the first pass, yet the foam adheres to the mesh.

In FIG. 5, the foam-mesh laminate 510 is delivered to one of two rollers 410 where a burner apparatus 420 on only one side of the laminate heats the foam face with an aggressive flame in the second pass. The burner apparatus 420 is selectively positioned at angle Y that may differ in magnitude from angle X shown in FIG. 4, but that is defined similarly. Accordingly, the predetermined temperature existent at the foam surface and the predetermined speed may differ as well since the objective is different in the second pass. The high-loft layer 130 is delivered to the other of the two rollers 410 and juxtaposed with the foam-mesh laminate 510 at the same speed with which the laminate passes by the flame. Properly processing the foam-mesh laminate requires that the foam experiences a sufficiently high temperature to adhere the foam more securely to the mesh and to adhere the foam securely to the high-loft fabric. If the temperature is too low or too high, then the foam may, respectively, not collapse sufficiently or be destroyed during processing. The required temperature will depend upon several factors including, but not limited to, the parameters indicate above and in the examples below, the type and construction of the laminating device, burner(s), or rollers, the type of foam(s) or fabric(s), and the degree of wind-resistance desired. However, within some range of process conditions the foam cells will collapse into a tiny-pored membrane that will cure to be wind-resistant and breathable. In this manner, a fabric laminate according to the present invention is produced. The preferred process conditions and laminate properties are further described in the examples below.

EXAMPLE 1

A CCMT laminate was produced according to a preferred embodiment of the method described above by using a foam flame lamination device at the listed process conditions:

| Condition | First Pass | Second Pass |
|---|---|---|
| Flame angle | 95°–105° | 100°–110° |
| Foam exposure temp. (°C.) | 400–455 | 455–510 |
| Gas feed rate per portion of burner width (kJ/cm) [BTU/in] | 415 [1000] | 415 [1000] |
| Nozzle type | soft flame burner | soft flame burner |
| Fuel ratio (air:gas volume) | 9.3:1–9.7:1 | 9.3:1–9.7:1 |
| Flame dwell time on foam (sec.) | 0.70–0.80 | 0.60–0.70 |

EXAMPLE 2

A Glenoit berber (available from Glenoit Mills, Inc. of New York, N.Y.) was tested and found to exhibit air penetration at the rate of 69.3 $m^3/min/m^2$. By contrast, a laminate of Glenoit berber and Rentex mesh (available from Rentex Mills, Inc. of Montreal, Canada) was prepared according to the present invention and found to exhibit air penetration at the rate of 7.3 $m^3/min/m^2$.

EXAMPLE 3

A single-faced fleece was tested and found to exhibit air penetration at the rate of 45.4 $m^3/min/m^2$. By contrast, a laminate of single-faced fleece and brushed tricot was prepared according to the present invention and found to exhibit air penetration at the rate of 8.5 $m^3/min/m^2$.

While the invention has been particularly shown and described with reference to preferred embodiments thereof, it will be understood by those skilled in the art that various changes in form and details may be made therein without departing from the spirit and scope of the invention. Accordingly, unless otherwise specified, any dimensions of the apparatus indicated in the drawings or herein are given as an example of possible dimensions and not as a limitation. Similarly, unless otherwise specified, any sequence of steps of the method indicated in the drawings or herein are given as an example of a possible sequence and not as a limitation.

We claim:

1. A laminate comprising a plurality of layers, at least one layer being flame bonded to at least one other layer solely by a foam layer therebetween and each non-foam layer having a predetermined wind resistance, wherein the flame bonding at least partially collapses cells in the foam layer to produce an increased wind resistance of the foam layer and wherein the wind resistance of the non-foam layers along with the increased wind resistance of the collapsed cell foam layer yield a laminate that is 70–99% wind-resistant overall.

2. The laminate of claim 1, wherein said laminate is 80–90% wind-resistant.

3. The laminate of claim 1, wherein said laminate exhibits a permeability index of greater than 0.4 and a comfort limit of greater than 100 $W/m^2$.

4. The laminate of claim 1, wherein said foam layer comprises polyester polyurethane or polyether polyurethane foam.

5. The laminate of claim 1, wherein, aside from said foam layer, said layers are individually less than 70% wind-resistant.

6. The laminate of claim 1, comprising a first layer and a second layer, aside from said foam layer, wherein the material for the first layer is selected from the group consisting of berber, pile, fleece, and high-loft fabrics and the material for the second layer is selected from the group consisting of mesh and tricot.

7. The laminate of claim 1, wherein, aside from said foam layer, each of said layers comprise a material independently selected from the group consisting of mesh, tricot, berber, pile, fleece, high-loft fabrics, and materials that are both breathable and greater than 70% wind-resistant.

8. The laminate of claim 7, further comprising one additional foam layer and one additional non-foam layer.

9. A laminate comprising a first layer, a second layer, and a foam layer, wherein:
   the first layer is flame bonded to the second layer solely by the foam layer;
   the laminate exhibits a permeability index of greater than 0.4, a comfort limit of greater than 100 $W/m^2$, and 80–90% wind-resistance;
   the foam layer comprises polyester polyurethane or polyether polyurethane foam;
   the first and second layers are individually less than 70% wind-resistant; and
   the material for the first layer is selected from the group consisting of berber, pile, fleece, and high-loft fabrics and the material for the second layer is selected from the group consisting of mesh and tricot.

10. The laminate of claim 9, further comprising one additional foam layer and one additional non-foam layer.

11. A wind-resistant, breathable laminate produced by the process comprising:
   a first pass comprising heating only a first side of a foam sheet with a gentle flame and juxtaposing the first side against a first material; and
   a second pass comprising heating only a second side of the foam sheet with an aggressive flame and juxtaposing the second side against a second material, wherein the first material is bonded to the second material, the foam sheet collapses to form a porous membrane, and the laminate is 70–99% wind-resistant.

12. The laminate of claim 11, wherein said laminate is 80–90% wind-resistant.

13. The laminate of claim 11, wherein said laminate exhibits a permeability index of greater than 0.4 and a comfort limit of greater than 100 $W/m^2$.

14. The laminate of claim 11, wherein said foam sheet comprises polyester polyurethane or polyether polyurethane foam.

15. The laminate of claim 11, wherein, aside from said foam sheet, said materials are individually less than 70% wind-resistant.

16. The laminate of claim 11, wherein said second material is selected from the group consisting of berber, pile, fleece, and high-loft fabrics and the first material is selected from the group consisting of mesh and tricot.

17. The laminate of claim 11, wherein, aside from said foam sheet, each of said materials are independently selected from the group consisting of mesh, tricot, berber, pile, fleece, high-loft fabrics, and materials that are both breathable and greater than 70% wind-resistant.

18. The laminate of claim 17, further comprising:
   a third pass comprising heating only a first side of a second foam sheet with a gentle flame and juxtaposing the first side against either said first material or said second material; and
   a fourth pass comprising heating only a second side of the second foam sheet with an aggressive flame and juxtaposing the second side against a third material.

19. The laminate of claim 18, wherein said second material is selected from the group consisting of materials that are both wind-resistant and breathable, wherein said first side of said second foam sheet is juxtaposed against the second material, and wherein said third material is selected from the group consisting of berber, pile, fleece, and high-loft fabrics.

20. A wind-resistant, breathable laminate produced by the process comprising:
   a first pass comprising heating only a first side of a foam sheet with a gentle flame and juxtaposing the first side against a first material; and
   a second pass comprising heating only a second side of the foam sheet with an aggressive flame and juxtaposing the second side against a second material, wherein:
      the first material is bonded to the second material and the foam sheet collapses to form a porous membrane;
      the laminate exhibits a permeability index of greater than 0.4, a comfort limit of greater than 100 W/m$^2$, and 80–90% wind-resistance;
      the foam sheet comprises polyester polyurethane or polyether polyurethane foam;
      the first and second materials are individually less than 70% wind-resistant; and
      the second material is selected from the group consisting of berber, pile, fleece, and high-loft fabrics and the first material is selected from the group consisting of mesh and tricot.

21. A process for fabricating a wind-resistant, breathable laminate comprising:
   selecting an overall wind resistance between 70–99%;
   a first pass comprising heating only a first side of a foam sheet with a gentle flame and juxtaposing the first side against a first material; and
   a second pass comprising heating only a second side of the foam sheet with an aggressive flame and juxtaposing the second side against a second material, wherein the first material is bonded to the second material, the foam sheet collapses to form a porous membrane, and the laminate is 70–99% wind-resistant.

22. The process of claim 21, wherein said laminate is 80–90% wind-resistant.

23. The process of claim 21, wherein said laminate exhibits a permeability index of greater than 0.4 and a comfort limit of greater than 100 W/m$^2$.

24. The process of claim 21, wherein said foam sheet comprises polyester polyurethane or polyether polyurethane foam.

25. The process of claim 21, wherein, aside from said foam sheet, said materials are individually less than 70% wind-resistant.

26. The process of claim 21, wherein said second material is selected from the group consisting of berber, pile, fleece, and high-loft fabrics and the first material is selected from the group consisting of mesh and tricot.

27. The process of claim 21, wherein, aside from said foam sheet, each of said materials are independently selected from the group consisting of mesh, tricot, berber, pile, fleece, high-loft fabrics, and materials that are both breathable and greater than 70% wind-resistant.

28. The process of claim 21, further comprising:
   a third pass comprising heating only a first side of a second foam sheet with a gentle flame and juxtaposing the first side against either said first material or said second material; and
   a fourth pass comprising heating only a second side of the second foam sheet with an aggressive flame and juxtaposing the second side against a third material.

29. The process of claim 28, wherein said second material is selected from the group consisting of materials that are both breathable and greater than 70% wind-resistant, wherein said first side of said second foam sheet is juxtaposed against the second material, and wherein said third material is selected from the group consisting of berber, pile, fleece, and high-loft fabrics.

30. A process for fabricating a wind-resistant, breathable laminate comprising:
   a first pass comprising heating only a first side of a foam sheet with a gentle flame and juxtaposing the first side against a first material; and
   a second pass comprising heating only a second side of the foam sheet with an aggressive flame and juxtaposing the second side against a second material, wherein:
      the first material is bonded to the second material and the foam sheet collapses to form a porous membrane;
      the laminate exhibits a permeability index of greater than 0.4, a comfort limit of greater than 100 W/m$^2$, and 80–90% wind-resistance;
      the foam sheet comprises polyester polyurethane or polyether polyurethane foam;
      the first and second materials are individually less than 70% wind-resistant; and
      the second material is selected from the group consisting of berber, pile, fleece, and high-loft fabrics and the first material is selected from the group consisting of mesh and tricot.

* * * * *